Nov. 30, 1948.  H. N. BOYER  2,455,110
TRACTION DEVICE FOR TRACTORS
Filed June 8, 1945
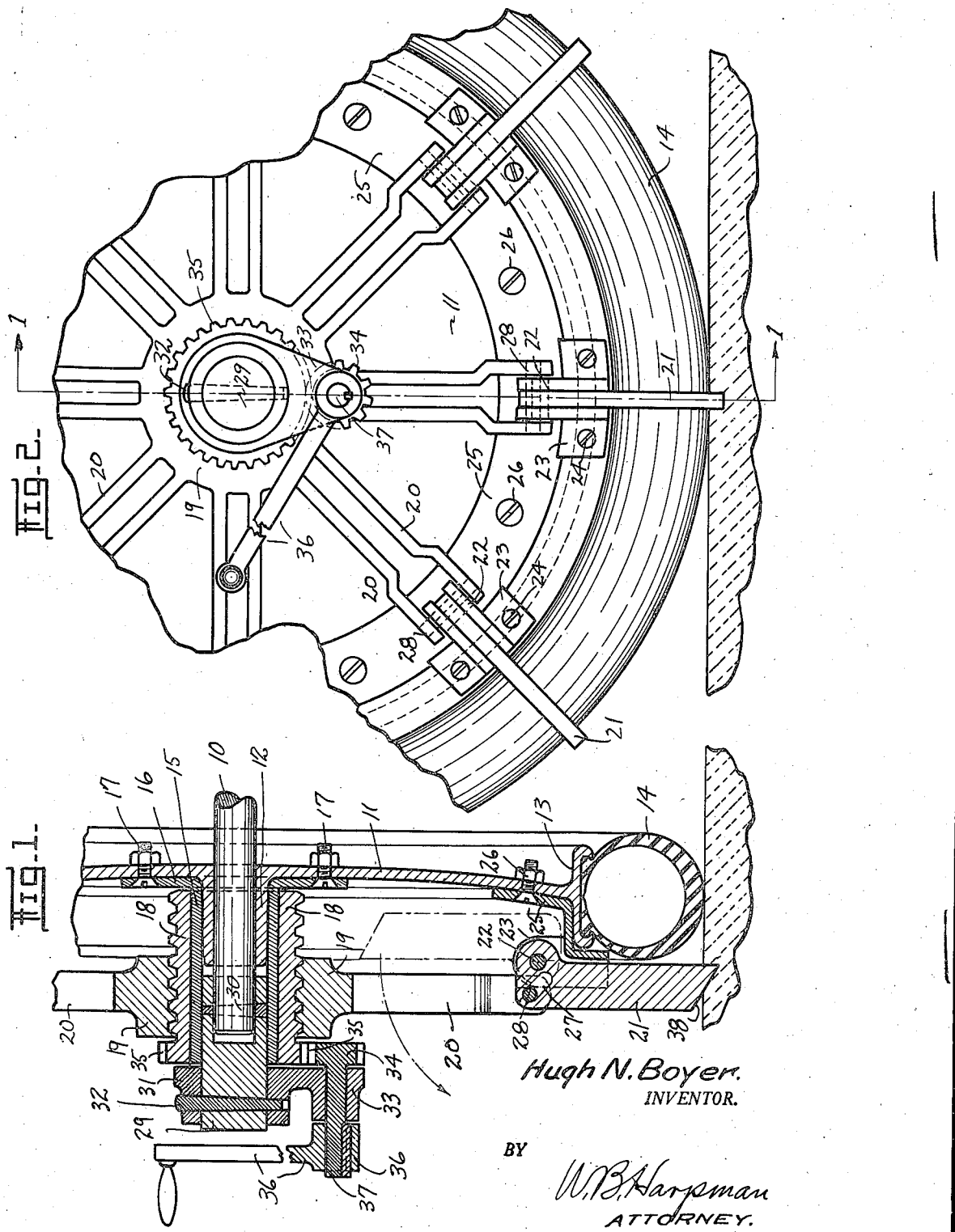
Hugh N. Boyer.
INVENTOR.
BY
W. B. Harpman
ATTORNEY.

Patented Nov. 30, 1948

2,455,110

UNITED STATES PATENT OFFICE 2,455,110

TRACTION DEVICE FOR TRACTORS

Hugh N. Boyer, Canfield, Ohio

Application June 8, 1945, Serial No. 598,285

4 Claims. (Cl. 301—47)

This invention relates to a traction device and more particularly to such a device designed for application to tractor wheels.

The principal object of the invention is the provision of a traction device for tractors.

A further object of the invention is the provision of a traction device for tractor wheels incorporating a plurality of ground engaging lugs retractably mounted with respect to the tractor wheels.

A still further object of the invention is the provision of means for imparting motion to a plurality of retractable lugs on a tractor wheel.

A still further object of the invention is the provision of a traction device for a tractor capable of being installed on a tractor by other than a skilled workman.

The traction device shown and described herein has been primarily designed for application to tractors such as are commonly employed on farms in supplying motive power for earth handling equipment. It is well known that many attempts have been made to form devices of this nature which may be utilized in connection with pneumatic tired tractors so as to enable the same to be more advantageously employed on soft or loose soil. It is known that most of these proposed devices have been unsuccessful in application due to their complexity of parts and the difficulties of assembly on conventional tractor wheels. The present invention relates to a traction device for a tractor which may be readily installed on various types of conventional tractor wheels. The device consists of a relatively simple apparatus incorporating a plurality of ground engaging lugs so arranged that they may be maintained in ground engaging operation or retracted as desired.

With the foregoing and other objects in view which will appear as the description proceeds, the invention resides in the combination and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a cross sectional elevation, with parts broken away, of the traction device showing the same installed on a tractor wheel and axle.

Figure 2 is a side elevation with parts broken away illustrating a tractor wheel and axle with the traction device installed thereon. Line 1—1 on Figure 2 indicates the approximate cross section of Figure 1.

By referring to the drawings and Figure 1 in particular it will be seen that an end section 10 of a transversely positioned, conventional tractor axle has been disclosed and has mounted thereon in a conventional manner a tractor wheel 11 which includes a hub 12. The tractor wheel 11 is provided with a conventional flanged rim 13 and has a rubber tire 14 positioned thereon. A traction device is shown on the tractor wheel and consists of a sleeve 15 provided with an annular flange 16 which enables the sleeve 15 to be bolted to the wheel 11 over the hub 12 by means of a plurality of bolts 17. The sleeve 15 provides a bearing surface for a worm gear 18 of tubular formation rotatably mounted upon the exterior of the sleeve 15. The rotatably mounted worm gear 18 carries a wheel-like member 19 which is provided with threads engaging the threads of the worm gear 18. The engaging threads are so arranged that upon the rotation of the worm gear 18 about the sleeve 15 the wheel-like member 19 travels inwardly or outwardly of the tractor wheel 11 on a horizontal axis. This construction provides for the useful movement of a plurality of spoke-like arms 20 of the wheel-like member 19, each of which extends to a point adjacent the rim 13 of the tractor wheel 11 and each of which is provided at its lowermost end with means for motivating a plurality of ground engaging lugs 21. The ground engaging lugs 21 are pivoted by means of pivots 22 to brackets 23 which in turn are affixed as by means of bolts 24 to a ring 25 which in turn is bolted to the tractor wheel by means of a plurality of bolts 26. Each of the ground engaging lugs 21 is pivoted to the brackets 23 and hence to the tractor wheel 11 by way of the ring mounting member 25 and each is pivoted between the lowermost end of a pair of spoke-like arms 20. Thus, movement on a horizontal axis by the wheel-like member 19 carrying the spoke-like arms 20 will cause the plurality of retractable lugs 21 to move in approximately 180 degrees to either a downwardly depending, ground engaging position as shown in solid lines in Figures 1 and 2, or to an upwardly extending, retracted position as shown by broken lines in Figure 1. It will be observed that in upward retracted position each of the plurality of ground engaging lugs 21 moves between a pair of the spoke-like arms 20. A slot 27 is formed in each of the lugs 21 and cooperates with a pivot 28 carried between the lowermost ends in each of the spoke-like arms 20 to achieve this motion.

In order that rotary motion may be imparted to the tubular worm gear 18 mounted on the sleeve 15 so that the wheel-like member 19 carrying the plurality of spoke-like arms 20 may be moved on a horizontal axis, means has been provided for manual actuation and consists of an axle extension 29 pinned by a pin 30 to the tractor axle 10 and carrying upon its outermost end a collar 31 which in turn is pinned on the outward end of the axle extension 29 by means of a pin 32. A bracket 33 is formed on the collar 31 and carries in a rotatable manner a gear 34 which engages a gear 35 formed on the outermost end of the worm gear 18 so that at such time as a crank 36 is positioned on the outermost end of a shaft 37 forming a part of the gear 34 and the gear 34 revolved thereby, the rotating action is imparted to the tubular worm gear 18 causing it to rotate about the sleeve 15 and thereby impart horizontal movement to the wheel-like member 19 and hence the spoke-like arms 20 formed thereon. It will be observed that the mechanism is so designed that the collar 31 forms a retaining member for the tubular gear 18 so as to confine it to its position on the sleeve 15. It will also be observed that the degree of leverage capable of being imparted to the gear 34 by means of the handle 36 affixed to the shaft 37 of the gear 34 enables the tubular worm gear 18 to be revolved at any time such as, for example, in moving the ground engaging lugs 21 into ground engaging position.

By referring to Figure 1 of the drawings it will be observed that the lowermost end of each of the ground engaging lugs 21 is formed at an angle to the perpendicular sides of the lugs 21 and is indicated by the numeral 38. This angular formation of the ground engaging section of the lugs 21 causes, by engagement with the ground, their automatic retention in the position illustrated; against the side of the rubber tire 14.

It will thus be seen that a relatively simple and efficient traction device for a tractor wheel has been disclosed and it is obvious that the device is installed on a conventional tractor in pairs, one on each of the principal driving wheels. The installation is a relatively simple operation as it is necessary only to drill appropriately located holes in the tractor wheel and mount the sleeve 15 and the ring 25 and assemble the several relatively simple parts thereon. It will be observed that in assembled relation on a pair of tractor wheels the traction devices may be readily moved into ground engaging position, as illustrated in the drawings, by means of a simple manual rotation of the crank 36 which may be removably affixed to the shaft 37 on the gear 34. It will also be seen that at such time as it is desired to retract the ground engaging lugs as, for example, when the tractor is to be driven upon a hard pavement, simple rotation of the gear 34 will rotate the worm gear 18 and cause the wheel-like member 19 to move on a horizontal axis so as to impart the desired movement to the plurality of spoke-like arms 20 and hence to each of the plurality of ground engaging lugs 21. Such movement imparted to the lugs 21 through the mechanism provided, causes the lugs 21 to move either into the ground engaging or retracted position as desired. It is obvious that if desired a mechanical power take-off may be utilized for applying the rotating motion to the gear 35 and hence the tubular worm gear 18.

It will thus be seen that a simple and efficient traction device for a tractor has been disclosed which may be formed of a relatively few parts and installed by an unskilled workman on a tractor and operated thereafter effectively and efficiently.

Having thus described my invention, what I claim is:

1. In a traction device for a tractor wheel a plurality of ground engaging lugs pivotally attached to a rim of said wheel, slots in said lugs, means for moving said lugs comprising a worm gear rotatably positioned about the hub of the said tractor wheel, a member threadably engaging the said worm gear for horizontal travel thereon, a plurality of radially spaced spokes on said member, said spokes disposed on a vertical plane through said hub the outermost ends of the said spokes lying adjacent the said lugs, pivot means engaging said slots in said lugs and said spokes, and means for applying rotary motion to said worm gear so as to move said member and spokes horizontally and move said lugs about their pivotal attachment to said rim.

2. In a traction device for a tractor wheel, a ring having a plurality of brackets thereon and mounted on said wheel adjacent the rim thereof, a plurality of ground engaging lugs pivotally attached to said brackets, slots in said lugs, means for moving said lugs comprising a worm gear rotatably positioned about the hub of the said tractor wheel, a member threadably engaging the said worm gear for horizontal travel thereon, a plurality of radially spaced spokes on said member, said spokes disposed on a vertical plane through said hub, the outermost ends of the said spokes lying adjacent the said lugs pivots engaging said slots in said lugs and said spokes, and means for applying rotary motion to said worm gear so as to move said member and spokes horizontally and move said lugs about their pivotal attachment to said brackets.

3. In a traction device for a tractor wheel, a plurality of ground engaging lugs pivotally attached to a rim of said wheel, slots in said lugs, means for moving said lugs comprising a worm gear rotatably positioned about the hub of the said tractor wheel, a member threadably engaging the said worm gear for horizontal travel thereon, a plurality of radially spaced vertical spokes on said member, said spokes disposed on a vertical plane on said hub, the outermost ends of the said spokes lying adjacent said lugs, pivots engaging said slots in said lugs and said spokes and means for applying rotary motion to said worm gear so as to move said member and spokes horizontally and move said lugs about their pivotal attachment to the said rim.

4. In a traction device for a tractor wheel a ring having a plurality of brackets thereon and mounted on said wheel adjacent the rim thereof, a plurality of ground engaging lugs pivotally attached to said brackets, diagonally positioned slots in said lugs, means for moving said lugs comprising a worm gear rotatably positioned about the hub of the said tractor wheel, a member threadably engaging the said worm gear for horizontal travel thereon, a plurality of radially spaced vertical spokes on said member, said spokes disposed on a vertical plane through said hub, the outermost ends of the said spokes lying adjacent the said lugs and pivot means engaging said diagonally positioned slots in said lugs and said spokes, and means for applying rotary motion to said worm gear so as to move said member and spokes horizontally and move said lugs about their pivotal attachment to said bracket.

HUGH N. BOYER.

REFERENCES CITED

The following references are of record in the file of this patent:

UNITED STATES PATENTS

| Number | Name | Date |
|---|---|---|
| 877,152 | Wilson | Jan. 21, 1908 |
| 1,369,174 | Highfield | Feb. 22, 1921 |
| 1,376,792 | Ballard | May 3, 1921 |
| 1,906,776 | Straussler | May 2, 1933 |
| 2,032,293 | Maxwell | Feb. 25, 1936 |
| 2,377,195 | Van de Hey | May 29, 1945 |

FOREIGN PATENTS

| Number | Country | Date |
|---|---|---|
| 362,851 | France | 1906 |